United States Patent [19]
Perry et al.

[11] Patent Number: 5,911,492
[45] Date of Patent: *Jun. 15, 1999

[54] METALLIZED HIGH INTENSITY GAUGE POINTER

[75] Inventors: Kenneth David Perry, New Lothrop; John M. Krasny, Grand Blanc, both of Mich.

[73] Assignee: Delco Electronics Corporation, Kokomo, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,559

[22] Filed: Oct. 15, 1996

[51] Int. Cl.⁶ ...................................................... G01D 11/28
[52] U.S. Cl. ............................... 362/26; 362/26; 362/29; 362/30
[58] Field of Search .................................. 362/26, 29, 30

[56] References Cited

U.S. PATENT DOCUMENTS

| 2,536,557 | 1/1951 | Levesque | 362/29 |
| 2,831,453 | 4/1958 | Hardesty | 362/26 |
| 3,033,155 | 5/1962 | Beckman | 362/29 |
| 3,216,394 | 11/1965 | Blackwell | 362/29 |
| 4,959,759 | 9/1990 | Kohler | 362/29 |

*Primary Examiner*—Ira S. Lazarus
*Assistant Examiner*—David Lee
*Attorney, Agent, or Firm*—Jimmy L. Funke

[57] ABSTRACT

A transparent pointer has a rear surface coated with white paint and the remainder is covered by a highly reflective metal layer except for a light emitting indicator strip and a light receiving surface. Stationary high flux LEDs mounted behind the pointer illuminate the light receiving surface. Received light is efficiently reflected to the indicator strip to produce a bright line suitable for viewing through a dark face plate to achieve a dark dead front appearance. To avoid reflections from the pointer the reflective layer is covered with a black film.

3 Claims, 1 Drawing Sheet

METALLIZED HIGH INTENSITY GAUGE POINTER

FIELD OF THE INVENTION

This invention relates to illuminated instrument pointers and related assemblies, and particularly to such pointers for high intensity light.

BACKGROUND OF THE INVENTION

In automotive instrument clusters it is necessary to illuminate the gauges. Generally the gauge indicia and the pointer are lighted by the same source. The pointer often presents a challenge to lighting attempts because it rotates about the gauge axis. For night time illumination it is known to illuminate a pointer of transparent plastic by directing light from a stationary source onto a light receiving surface adjacent the pointer axis and to reflect the light toward the pointer end. Features on the rear face of the pointer may promote light reflection to the front face where it escapes to render the pointer visible.

In some applications the instrument has a dead front appearance wherein nothing is visible except a lighted pointer and the lighted indicia. This is accomplished by covering the cluster with a smoky or tinted face plate which obscures cluster features which are not well lighted. To be viewable in daytime conditions the pointer must be intensely lighted. Generally this has been done by insert molding a number of LEDs in the pointer. This is expensive and further requires that power be supplied to the moving pointer.

SUMMARY OF THE INVENTION

It is therefore an object of the invention to brightly illuminate a gauge pointer inexpensively. Another object is to provide intense lighting of such a pointer without an electrical connection to the pointer. A further object is to obscure all parts of the pointer from view except for a narrow line of light when viewed through a dark lens.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
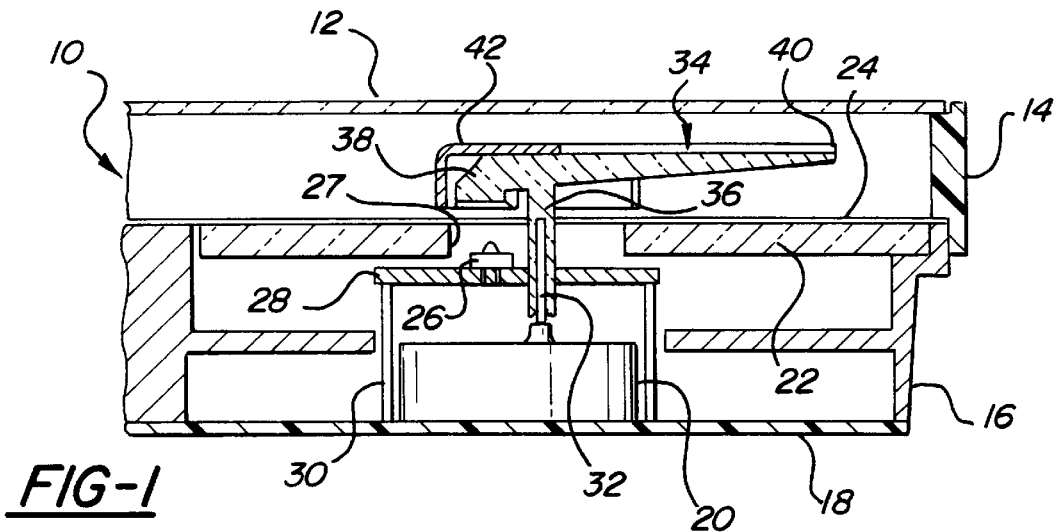
FIG. 1 is a cross section of an instrument cluster including a gauge having an illuminated pointer according to the invention.

Referring to FIG. 1, an instrument cluster 10 of a motor vehicle is positioned behind a face plate 12 which is smoky or tinted to give a dead front appearance to the instrumentation. A retainer 14 which snaps onto the cluster case 16 supports the face plate 12. The cluster comprises the case 16 bounded at its rear by a circuit board 18 which supports a gauge mechanism 20, and a light pipe or other transparent substrate 22 in front of the mechanism which carries an applique 24 defining the gauge indicia. One or more lamps 26 aligned with an opening 27 in the substrate 22 are mounted on a carrier 28 having legs 30 which reach the circuit board to provide support and to couple power to the lamp 26. A pointer shaft 32 extends from the gauge mechanism through the opening 27 to support a pointer 34 for rotation about the shaft axis.

Figure 2:
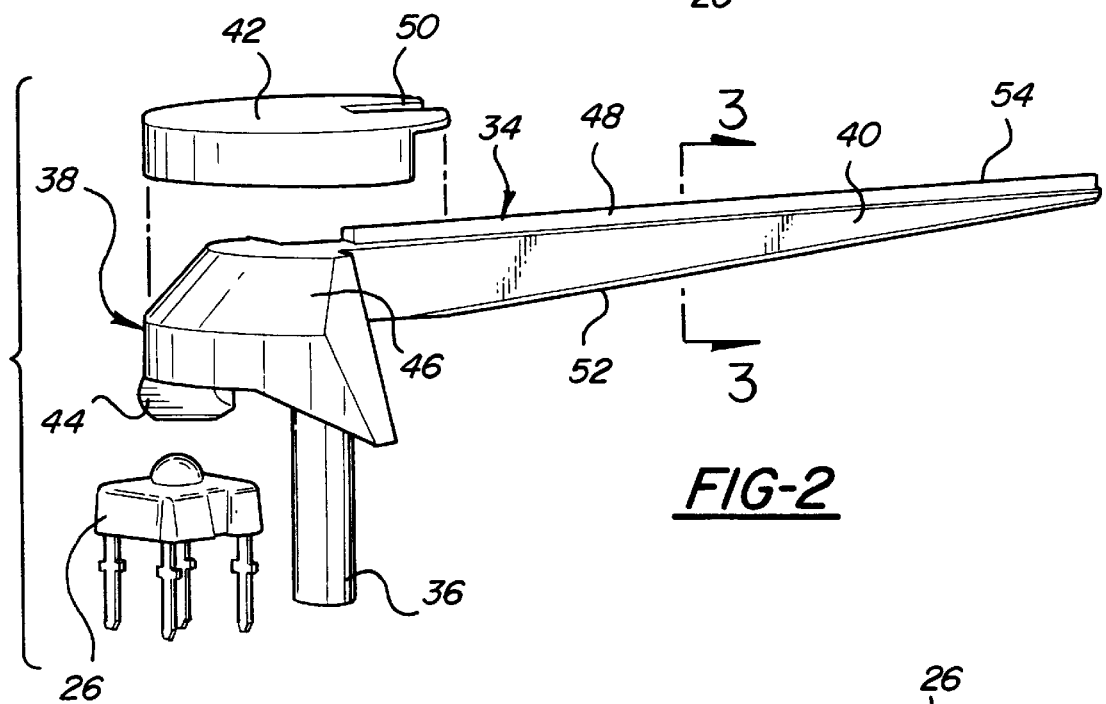
FIG. 2 is an exploded isometric view of the pointer, cap and lamp of FIG. 1.

The pointer 34, also shown in FIG. 2, has a transparent body, a front face facing toward the face plate 12, a rear face facing toward the applique 24, a tubular hub 36 which extends from the rear face and fits on the shaft 32, a light collector 38 on one side of the hub, and a needle 40 projecting from the opposite side of the hub. A cap 42 mounted on the front of the pointer covers the area over the opening 27 to prevent leakage of extraneous light.

The light collector 38 of the pointer 34 has an arcuate form extending concentric with and parallel to the axis and has a rear light receiving surface 44 spaced from the lamp 26 so that light can be collected from the lamp 26 or lamps even though the pointer sweeps through a large angle. To compensate for a loss of efficiency at the extremes of the pointer range, each side of the receiving surface 44 angles back to enhance the light collection efficiency at the extremes of the range, thereby enhancing light collection. Facets or an angled arcuate surface 46 in front of the surface 44 reflects received light into the needle 40.

Figures 3, 4:
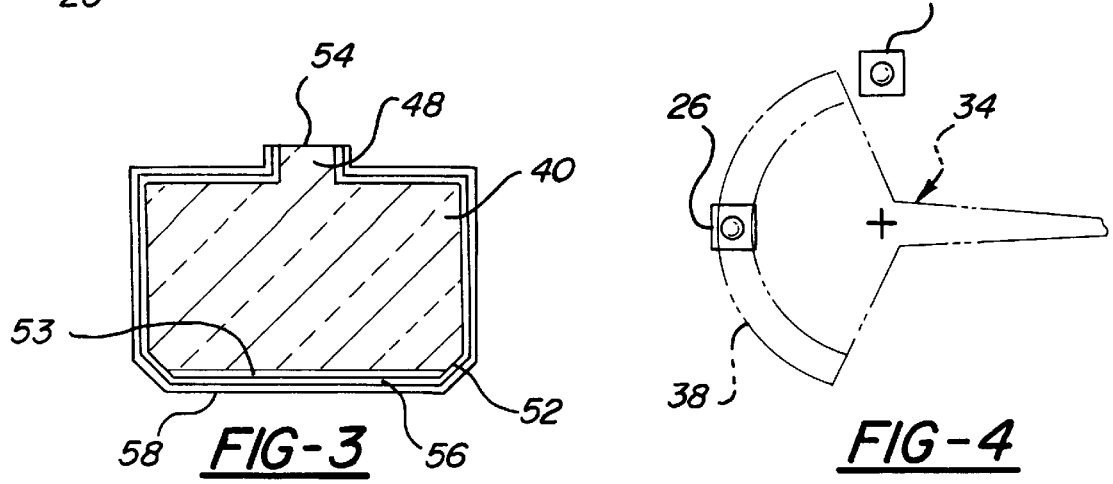
FIG. 3 is a cross section of the pointer needle taken along line 3—3 of FIG. 2.
FIG. 4 is a top view of the lamps of FIG. 1 with a phantom view of the pointer.

A light emitting ridge 48 or raised portion extends along the pointer needle 40. The cap 42 has a slot 50 which accommodates the ridge so that the cap does not obscure the ridge 48, although the extent of the ridge and of the slot depend on how far it is desired that the illuminated line should approach the pointer axis. As shown in FIG. 3, flat planes 52 at the rear corners of the needle are angled to optimize the internal light reflection toward the ridge. The flat rear surface of the needle is coated with a film 53 of white paint, as is common practice, to improve the light emission from the front surface. The film 53 and the remaining surface of the pointer except the outer surface 54 of the ridge and the light receiving surface 44 are coated with a metallic film 56 to efficiently reflect the light entering the receiving surface into the pointer and out through the ridge surface 54. Alternatively a white paint is used instead of the metallic film. To minimize light reflection from the outer surface of the pointer, a coat 58 of black paint is applied over the reflective coating. The ridge 48 is useful in defining the outer surface 54 which is a narrow indicator strip or line of light emission. The presence of the ridge facilitates masking when the reflective coating and the outer black coating are applied. Alternatively the whole of the needle may be painted and the portion on the ridge may then be machined off or otherwise removed to leave the light emitting surface 54 clear of paint. Where the process of making the pointer does not require a ridge, then the ridge is omitted but a clear light emitting strip is formed on the flat front of the needle by other means. In either embodiment, whether the indicator strip is a raised ridge or part of the flat front face, the strip is bounded on each side by front marginal portions which are part of the front face.

The lamp or lamps 26 must have sufficient light output to brightly light the pointer. High flux LEDs meet this requirement and are available in various colors. Such LEDs are manufactured by Hewlett Packard Corp. and identified as part number HPWT-MH00, for example. A light output of 2500 mlm has been found to be suitable. As shown in FIG. 4, more than one lamp 26 may be used around the pointer axis to extend the range of the pointer illumination. Also, by using lamps of different colors, the pointer color may be varied according to pointer position. Preferably the lamps 26 are used only for lighting the pointer. The display indicia defined by the applique 24 are illuminated by backlighting or by a light pipe using light sources, not shown.

In operation, when viewed through the dark face plate 12, the pointer appears as a bright thin line of a color determined by the lamp or lamps. No pointer features other than the line are visible due to the black outer coat on the pointer which suppresses light reflection.

The pointer is relatively inexpensive since it does not contain a series of LEDs and there is no electrical connection to the pointer. Due to the highly reflective coating on the pointer, the light received from the stationary LED source is efficiently utilized to maintain a bright line at the narrow indicator strip. The line is sufficiently intense for daytime viewing even when viewed through a dark face plate.

The embodiments of the invention in which an exclusive property or privilege is claimed are defined as follows:

1. A gauge pointer for illumination by a stationary light source comprising:

a transparent pointer body having a front face including an elongated narrow indicator strip bounded on each side by front marginal portions, and a rear face having a mounting hub and a light receiving area adjacent the hub; and a reflective coating on all of the body surface exclusive of the light receiving area and the indicator strip whereby light entering the receiving area is efficiently internally reflected and emitted at the indicator strip to produce a line of light, the reflective coating comprising white paint on the rear face and a metallic film which also covers the white paint on the rear face.

2. An instrument assembly comprising:

a cluster housing;

a gauge mechanism supported in the housing;

a pointer carried by the gauge mechanism for rotation about an axis;, a bright stationary light source mounted between the gauge mechanism and the pointer adjacent the axis for illuminating the pointer;

the pointer including a transparent pointer body having a front face including an elongated narrow indicator strip bounded on each side by front marginal portions, and a light receiving area adjacent the axis for illumination by the light source; and a reflective coating on all of the body exclusive of the light receiving area and the indicator strip whereby light entering the receiving area is efficiently internally reflected and emitted at the indicator strip to produce a line of light, the reflective coating comprising white paint on the rear face and a metallic film which also covers the white paint on the rear face.

3. An instrument assembly comprising:

a cluster housing;

a gauge mechanism supported in the housing;

a pointer carried by the gauge mechanism for rotation about an axis;

a bright stationary light source mounted between the gauge mechanism and the pointer adjacent the axis for illuminating the pointer, such light source including lamps for producing different colors of light to afford different pointer colors;

the pointer including a transparent pointer body having a front face including an elongated narrow indicator strip bounded on each side by front marginal portions, and a light receiving area adjacent the axis for illumination by the light source; and a reflective coating on all of the body exclusive of the light receiving area and the indicator strip whereby light entering the receiving area is efficiently internally reflected and emitted at the indicator strip to produce a line of light, the reflective coating on the rear face comprising white paint.

\* \* \* \* \*